(No Model.)
J. HEBERLING.
PANCAKE TURNER.
No. 594,205. Patented Nov. 23, 1897.
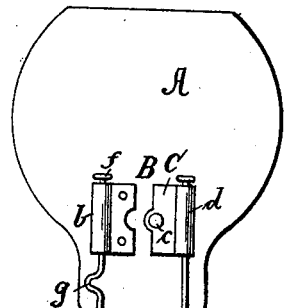
Fig. 1.
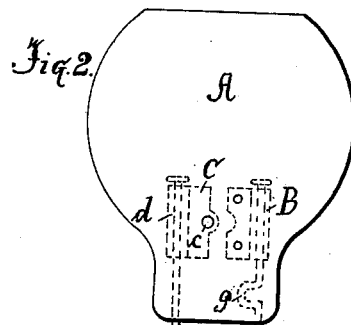
Fig. 2.
Fig. 3.
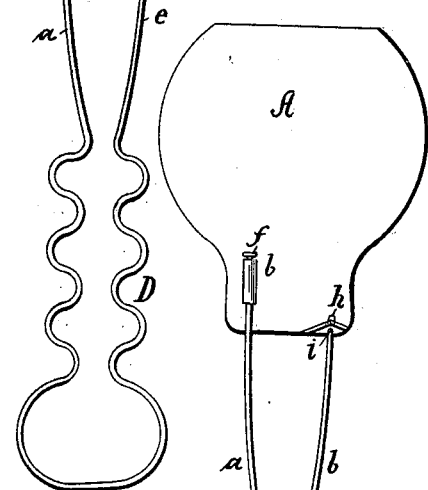
Fig. 4.
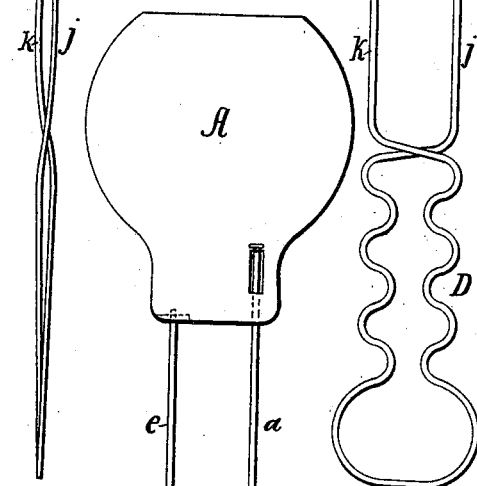
Fig. 5.
Fig. 6.
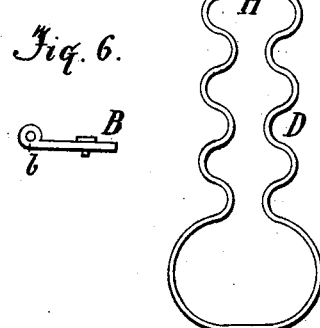
Fig. 7.
Witnesses
O. Seiffert
William H. Reid
Inventor
Jno. Heberling,
per M. M. Cady
Attorney

UNITED STATES PATENT OFFICE.

JOHN HEBERLING, OF ROCHESTER, NEW YORK.

PANCAKE-TURNER.

SPECIFICATION forming part of Letters Patent No. 594,205, dated November 23, 1897.

Application filed June 15, 1896. Serial No. 595,663. (No model.)

*To all whom it may concern:*

Be it known that I, JOHN HEBERLING, a citizen of the United States, residing at Rochester, in the county of Monroe and State of New York, have invented certain new and useful Improvements in Pancake-Turners; and I do hereby declare the following to be a full, clear, and exact description of the invention, such as will enable others skilled in the art to which it appertains to make and use the same.

The leading object of my invention is to provide the kitchen with a simple utensil for handling pancakes and that class of cakes cooked upon griddles; and it consists in pivoting to a blade a handle made of spring-wire and bent in such a manner that when compressed the two ends will cross each other, assuming an opposite position, and at the same time give a partial rotation to the blade and when they are released will return to their original position and rotate back the blade. The manner of effecting this, with other minor objects, will be described in the following specification, having reference to the accompanying drawings, which form a part hereof, and in which—

Figure 1 is a view of my invention from the under side. Fig. 2 is a view of the upper side of the blade and handle after the blade has been turned. Fig. 3 shows an edge view of Fig. 1. Fig. 4 is the same view as Fig. 1 with a modified form. Fig. 5 is the same view as Fig. 2 of the same form as Fig. 4. Fig. 6 is an end view of one of the journal-plates attached to the under side of the blade, and Fig. 7 shows a modified mode of holding one of the free ends of the handle in a journal.

Like letters of reference denote corresponding parts in all of the drawings.

In the drawings, A designates the blade. Near one end of the blade is riveted a journal-plate B, (shown in Figs. 6 and 7,) having a journal-box or loop *b*. Near to said plate B is a second plate C, pivoted to the blade by the pivot-pin *c* and having a journal-box or loop *d*. The handle D is preferably made of a single spring-wire bent double, the two free ends *a* and *e* being inserted in the journal-boxes *b* and *d*. The projecting end of the wire *a* has a shoulder *f*, which prevents it from being withdrawn. Instead of this shoulder the end of the wire *a* may be grooved at *n* and the edge of the box *b* may be turned down into the groove *n*, as shown in Fig. 7. There is also formed on wire *a* a loop *g*, against which the plate strikes in its back movement and is stopped. At the rear closed end of the handle the wires are spread or separated to form the handle proper and are preferably waved or corrugated, as shown.

It will be noticed in Fig. 3 that the end *e* is curved upwardly at *k* and the end *a* downwardly at *j* for the purposes presently to be described.

In Fig. 4 the pivot-plates B and C are dispensed with, and the arm *a* is inserted through two holes in the blade A, forming the journal *b*; also, the blade A is bent at *h*, and the arm *e* is inserted through a hole *i* in the bent portion *h*.

The manner of operating my device is as follows: The operator grasps the handle D and inserts the blade A beneath the cake, and then raises it a short distance above the griddle. The handle D is then compressed within the hand, causing the curve *j* in the arm *a* to slide up and past the curve *k* in the arm *e*, and when sufficiently compressed the arms *a* and *e* will assume the position shown in Fig. 2, the two arms *a* and *e* having crossed each other at the juncture H. In this position the blade A has been reversed or turned over, carrying the cake with it. In the act of compressing the handle the journal-plate C turns slightly on its pivot *c*, thus giving freedom of action and preventing binding as the plate A is rotated. The operation of the modified form shown in Fig. 4 is substantially the same. The two ends *a* and *e* of the handle will be forced past each other and will be caused to assume the position shown in Fig. 5. Upon the releasing of the handle the two ends will spring back to the position shown in Figs. 4 and 1 and turn the blade to its former position.

It is manifest that the loop G may be dispensed with, and in that case the preferable mode of preventing undue back movement of the blade when it is brought back will be by bending the arms *a* and *e* of the handle, as shown in Fig. 4, so that they will impinge one upon the other at the juncture H.

Having now described my invention, what I claim, and desire to secure by Letters Patent, is—

1. A cake-turner, consisting of a blade and a spring-handle having its two free ends pivoted or journaled to the blade and adapted to partly rotate the blade laterally, when said ends are forced across each other, for the purposes shown.

2. A cake-turner, consisting of a blade provided with two journal-boxes, one rigidly fixed upon the blade and the other pivoted thereto and a spring-handle having its free ends inserted in said journals and adapted to partly rotate the blade by forcing the two ends of the handle across each other, for the purposes shown.

3. A cake-turner, consisting of a blade, and a spring-handle having two free ends journaled to said blade, one of which is provided with a loop forming a stop to engage the blade and prevent undue rotation of same, the blade being rotated laterally by forcing the two arms of the handle across each other, as and for the purposes shown.

4. A cake-turner, consisting of a blade A, and a handle D, having the arms $a$, and $e$, journaled to the blade, the arm $a$, provided with the bend $j$, and the arm $e$, having the bend $k$, whereby the compressing of the handle, will force the arm, $e$, across the arm $a$, and partly rotate the blade, as and for the purposes shown.

In testimony whereof I affix my signature in the presence of two witnesses.

JOHN HEBERLING.

Witnesses:
 JNO. M. STULL,
 O. S. STULL.